F. G. SPINDLER.
HÆMACYTOMETER.
APPLICATION FILED MAY 27, 1918.
1,313,962.
Patented Aug. 26, 1919.
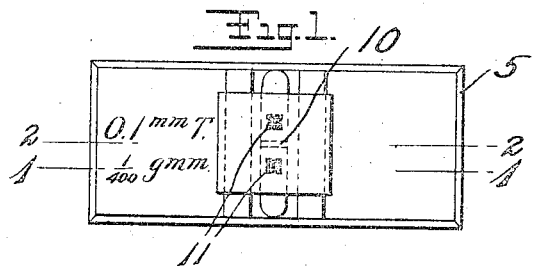
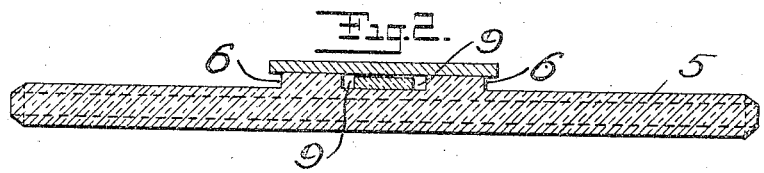
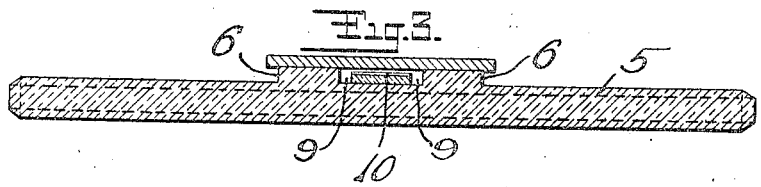
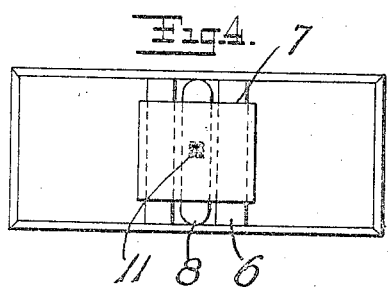
Ferdinand Gustave Spindler Inventor
By his Attorney
Clarence G. Campbell.

UNITED STATES PATENT OFFICE.

FERDINAND GUSTAVE SPINDLER, OF NEW YORK, N. Y., ASSIGNOR TO E. LEITZ, INC., OF NEW YORK, N. Y., A CORPORATION OF NEW YORK.

HÆMACYTOMETER.

1,313,962.   Specification of Letters Patent.   Patented Aug. 26, 1919.

Application filed May 27, 1918. Serial No. 236,817.

*To all whom it may concern:*

Be it known that I, FERDINAND GUSTAVE SPINDLER, a subject of the Emperor of Germany, residing at 431 West 214th street, New York city, in the county of New York and State of New York, have invented certain new and useful Improvements in Hæmacytometers, of which the following is a specification.

My invention relates to hæmacytometers in which there has been serious difficulty in making them strong enough for practical use and at the same time easy to handle.

My invention solves these problems by making the slide of uniform strength throughout and also facilitates the removal of the cover plate.

Referring to the accompanying drawings Figure 1 is a top plan view of my device with the cover plate in position as used. Fig. 2 is an enlarged longitudinal section on the line 1—1 of Fig. 1. Fig. 3 is an enlarged longitudinal section on the line 2—2 of Fig. 1. Fig. 4 is a top plan view of a modification showing a scale slip with a single cross hatch or microscopic scale.

In the drawings 5 is a slide having supports 6 integral therewith and projecting from its top surface a material distance above the top surface, thereby increasing the thickness of the slide, so that a cover plate 7 resting thereon can be readily picked up.

Parallel with the supports 6 is a scale slip 8 which is cemented to the slide 5 directly between the supports 6 and the top surface of which is in a plane a predetermined distance below the plane of the top surface of the supports 6. There is thereby formed between the scale slip 8 and the two cover plate supports 6 two gutters 9 and these are connected by a cross gutter 10 running across the scale slip 8 thereby dividing it, substantially into two parts on each end of which is a cross hatching or microscopic scale 11. The cover plate 7 is adapted to rest on the cover plate supports 6 so that the distance between the bottom of the cover plate 7 and the top of the scale slip 8 is the same as the difference between the planes of the top surface of the scale slip 8 and the top surface of the cover supports 6.

In use, a drop of blood to be examined is placed on one of the microscopic scales 11 shown in Fig. 1 and a drop of another kind of blood is dropped on the other microscopic scale 11 on the scale slip 8 in Fig. 1 and the cover plate 7 is then placed in position thereon, squeezing out the two drops on the microscopic scales 11 to the exact thickness required and any surplus from either passing into the gutters 9 and 10. The gutter 10 makes it impossible for the two specimens being examined to commingle through molecular action.

The embodiment of my device indicated in Fig. 4 is adapted only for the examination of one specimen and not for simultaneous examination of two inasmuch as there is only one microscopic scale 11 thereon.

I claim:

1. A hæmacytometer comprising a slide of uniform thickness having a scale slip mounted thereon and projecting slightly above the level of the top surface of the slide, two cover plate supports, integral with said slide and parallel with said scale slip and projecting materially above the level of the top surface of said scale slip.

2. A hæmacytometer comprising a slide of uniform thickness having a scale slip mounted thereon which has a cross gutter and a scale at each end projecting slightly above the level of the top surface of the slide, two cover plate supports parallel with said scale slip and projecting materially above the level of the top surface of said scale slip, said supports being integral with said slide.

3. A hæmacytometer comprising a slide of uniform thickness having a scale slip mounted thereon which embodies a microscopic scale and projecting slightly above the level of the top surface of the slide, two cover plate supports parallel with said scale slip and projecting materially above the level of the top surface of said scale slip, said supports being integral with said slide.

4. In a hæmacytometer the combination with a slide of uniform thickness of two cover plate supports integral therewith and a scale slip mounted thereon projecting slightly above the top of the slide, the plane of the top surface of the two cover plate supports being an exact predetermined measurement above the plane of the top surface of said scale slip, and a cover plate.

5. In a hæmacytometer the combination with a slide of uniform thickness of two cover plate supports integral therewith and a scale slip mounted between said supports having a cross gutter and a scale at each end projecting slightly above the top of the slide, the plane of the top surface of the two cover plate supports being an exact predetermined measurement above the plane of the top surface of said scale slip, and a cover plate.

6. In a hæmacytometer the combination with a slide of uniform thickness of two cover plate supports integral therewith and a scale slip mounted on the slide between said supports carrying a microscopic scale projecting slightly above the top of the slide, the plane of the top surface of the two cover plate supports being an exact predetermined measurement above the plane of the top surface of said scale slip, and a cover plate.

In testimony whereof I affix my signature.

FERDINAND GUSTAVE SPINDLER.